United States Patent [19]

Arai

[11] 4,227,793
[45] Oct. 14, 1980

[54] BLADE TYPE FOCAL PLANE SHUTTER

[75] Inventor: Kiyoyuki Arai, Tokyo, Japan

[73] Assignee: Copal Company Limited, Tokyo, Japan

[21] Appl. No.: 906,680

[22] Filed: May 16, 1978

[30] Foreign Application Priority Data

May 20, 1977 [JP] Japan .................................. 52-58405

[51] Int. Cl.³ .............................................. G03B 9/40
[52] U.S. Cl. ................................................... 354/246
[58] Field of Search ............................... 354/246, 247

[56] References Cited

U.S. PATENT DOCUMENTS

| 3,903,539 | 9/1975 | Kitai et al. ............................ 354/246 |
| 4,005,462 | 1/1977 | Papke .................................... 354/246 |

Primary Examiner—Monroe H. Hayes
Attorney, Agent, or Firm—Cushman, Darby & Cushman

[57] ABSTRACT

A blade type focal plane shutter comprising a plurality of auxiliary shutter blades rotatably supported on a common shaft and movable between an unfolded position and a folded position, a main shutter blade for forming an exposure slit and a blade supporting arm serving also as a covering member so that the entire shutter may be made small and may be manufactured at a low cost.

1 Claim, 14 Drawing Figures

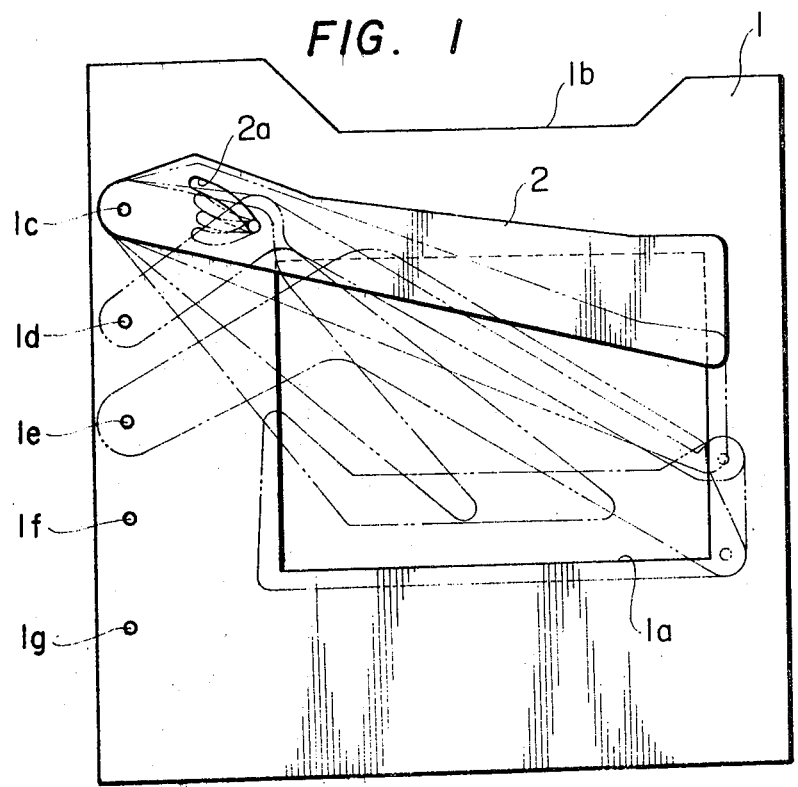
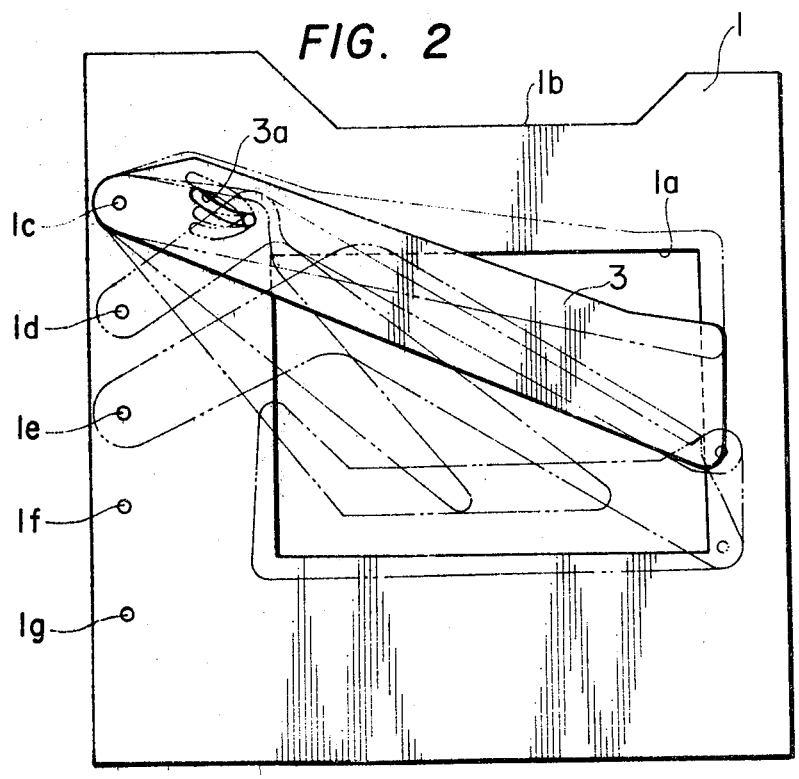

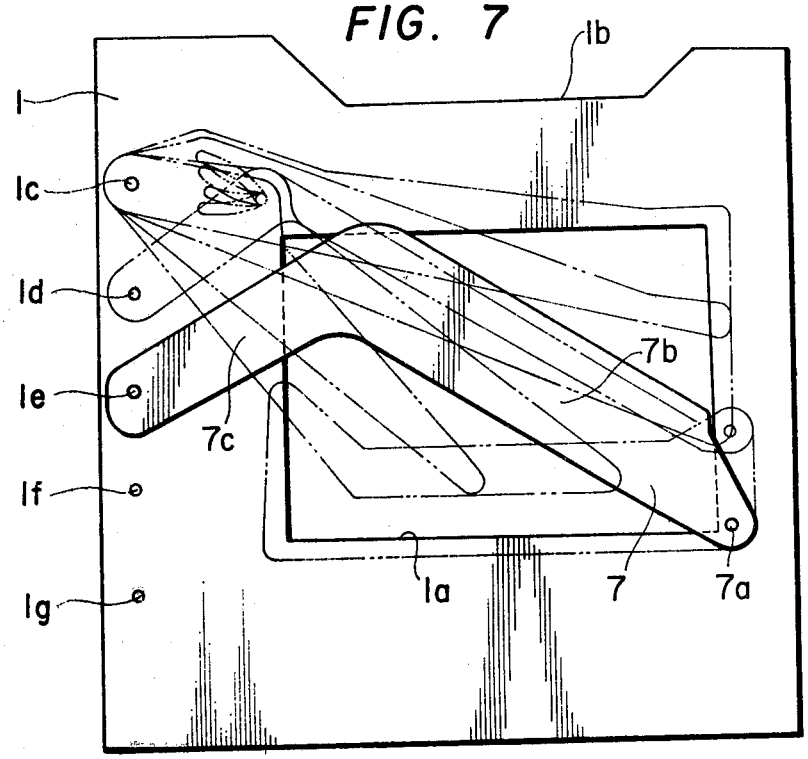
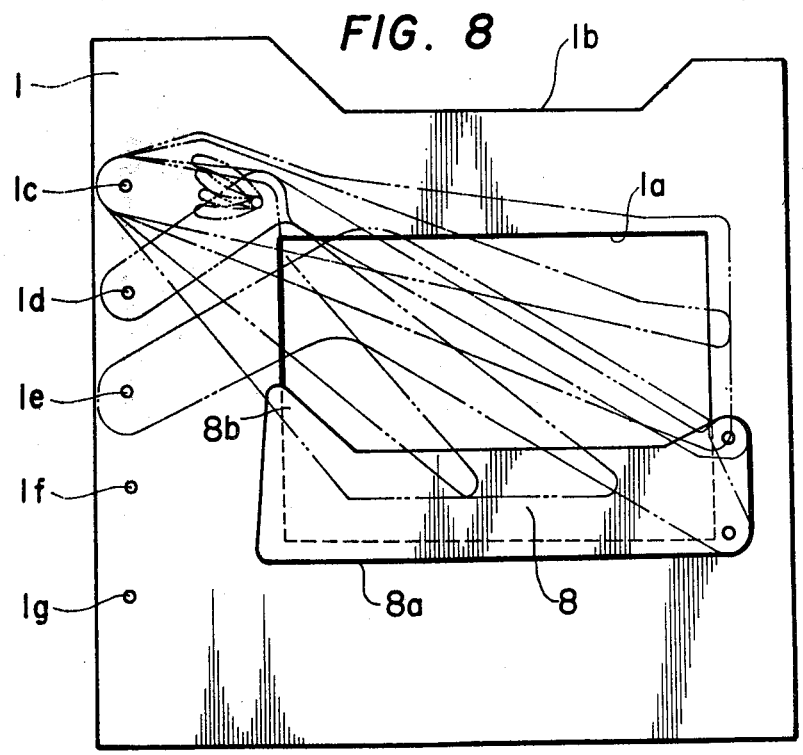

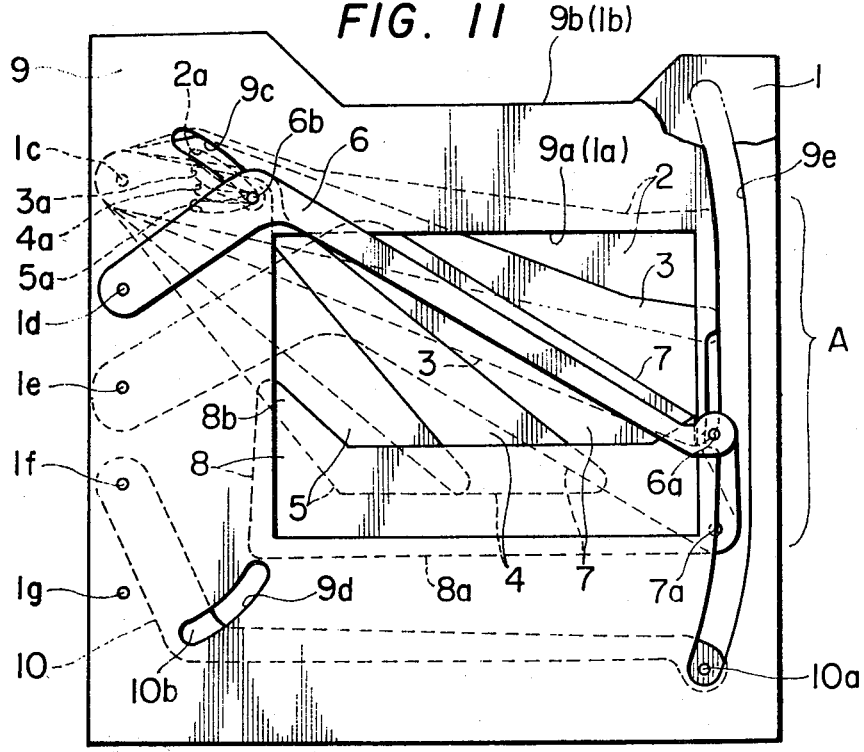
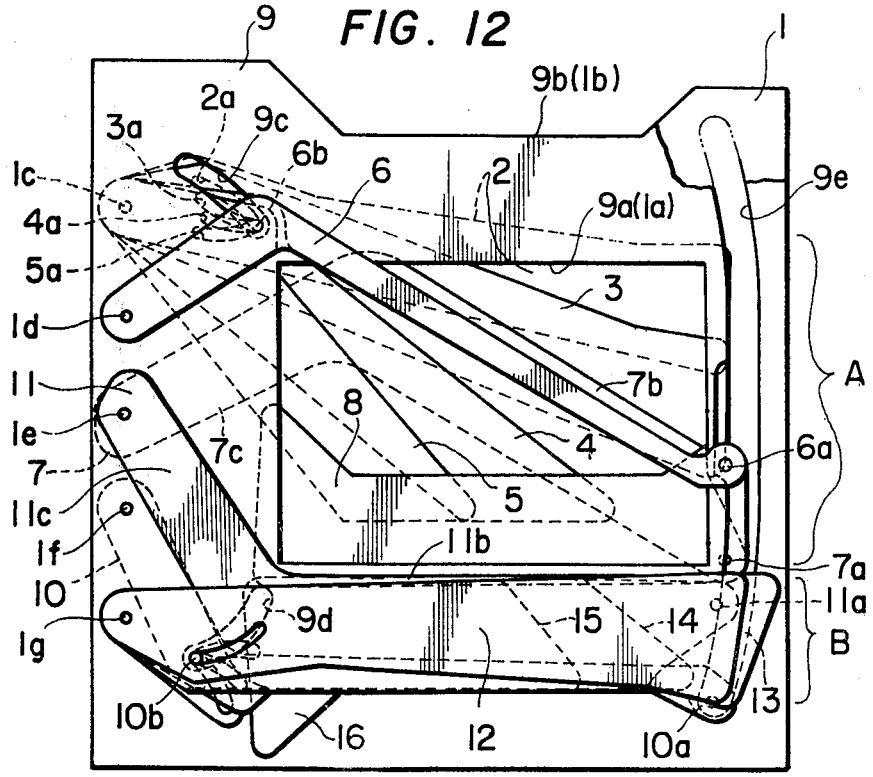

BLADE TYPE FOCAL PLANE SHUTTER

BACKGROUND OF THE INVENTION (a) Field of the Invention

This invention relates to a blade type focal plane shutter wherein exposure is made by moving a plurality of opaque laminae between their unfolded positions and their folded positions.

(b) Description of the Prior Art

This type of focal plane shutter is advantageous in manufacturing cameras in respect that the entirety can be formed as a unit independent of the camera body. With the recent trend of making cameras smaller, such type of focal plane shutter has also come to be required to be made smaller and to be manufactured at a low cost.

SUMMARY OF THE INVENTION

An object of the present invention is to provide a blade type focal plane shutter formed so as to be easy to make smaller than a conventional one in view of the above mentioned requirements.

Another object of the present invention is to reduce the manufacturing cost of this type of focal plane shutter by decreasing the number of component parts.

These and other objects of the present invention will become moe apparent during the course of the following detailed description and appended claims.

BRIEF DESCRIPTION OF THE DRAWINGS

FIGS. 1 to 10 are elevational views an embodiment of a focal plane shutter according to the present invention showing only a shutter opening blade group as unfolded to cover an exposure aperture for the convenience of the explanation;

FIG. 11 is an elevational view corresponding to FIG. 10 as fitted with a partition plate;

FIG. 12 is an elevational view of a focal plane shutter according to the present invention in its cocked state;

DESCRIPTION OF THE PREFERRED EMBODIMENT

Figure 3:
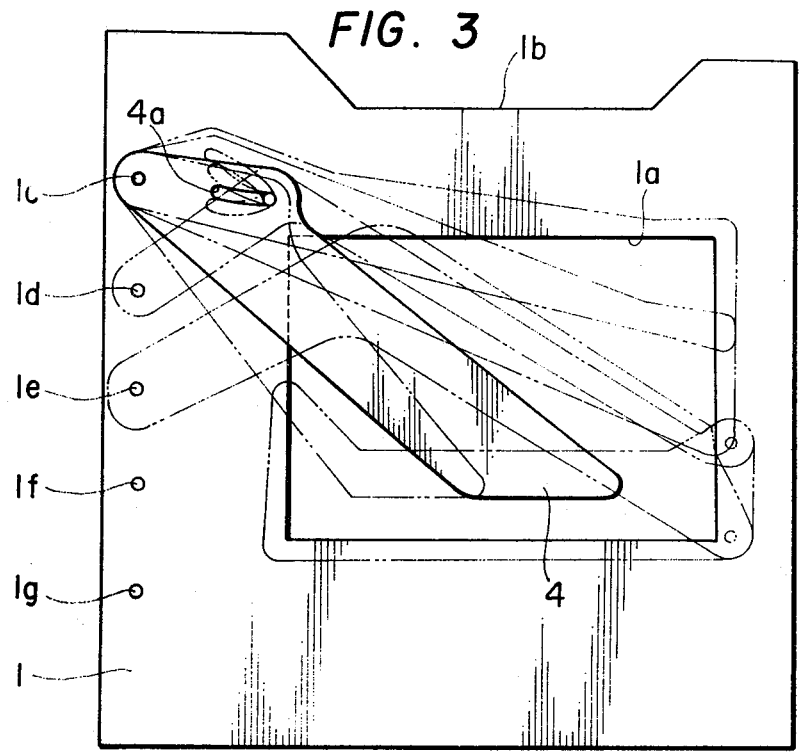

First, in FIGS. 1 to 10, reference numeral 1 indicates a shutter base plate having an exposure aperture $1a$, a recessed upper edge $1b$ and shafts $1c$, $1d$, $1e$, $1f$ and $1g$. Reference numerals 2, 3, 4 and 5 indicate auxiliary shutter blades made respectively of opaque laminae supported in the base portions rotatably on a shutter base plate 1 by a shaft $1c$ and having cam slots $2a$, $3a$, $4a$ and $5a$ formed respectively in them. Reference numeral 6 indicates a blade actuating arm which is rotatably supported on the shutter base plate 1 by the shaft $1d$, has a pin $6a$ and a pin $6b$ fitting the cam slots $2a$, $3a$, $4a$ and $5a$, is biased counterclockwise by a driving power source not illustrated and can be locked in the illustrated position by a locking mechanism not illustrated. Reference numeral 7 indicates a blade supporting arm which is supported rotatably on the shutter base plate 1 by the shaft $1e$ and has a pin $7a$ and a portion $7b$ serving to cover a portion of the aperture $1a$ in the illustrated position. Reference numeral 8 indicates a main shutter blade made of an opaque lamina which has an edge $8a$ for forming an exposure slit and is pivoted on the arm 6 by the pins $6a$ and $7a$. A tail portion which has an edge intersecting the edge of the exposure aperture $1a$ is formed in this main shutter blade 8. They are so formed that, in this case, the distance between the shafts $1d$ and $1e$ and the distance between the pins $6a$ and $7a$ may be equal to each other and the distance between the shaft $1d$ and pin $6a$ and the distance between the shaft $1e$ and pin 7 may be equal to each other.

Figure 10:
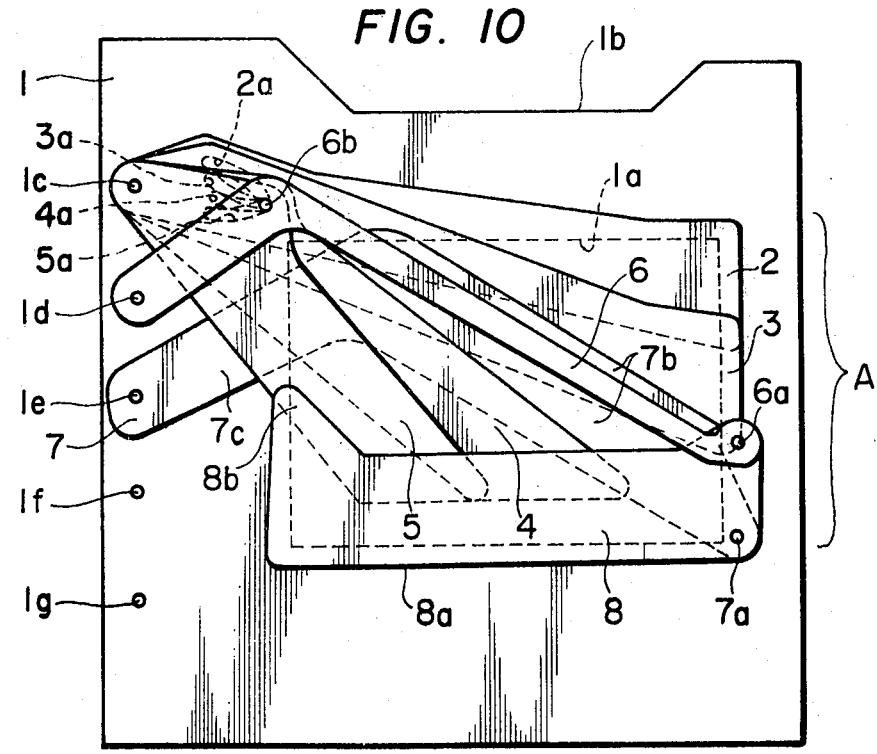
Figure 13:
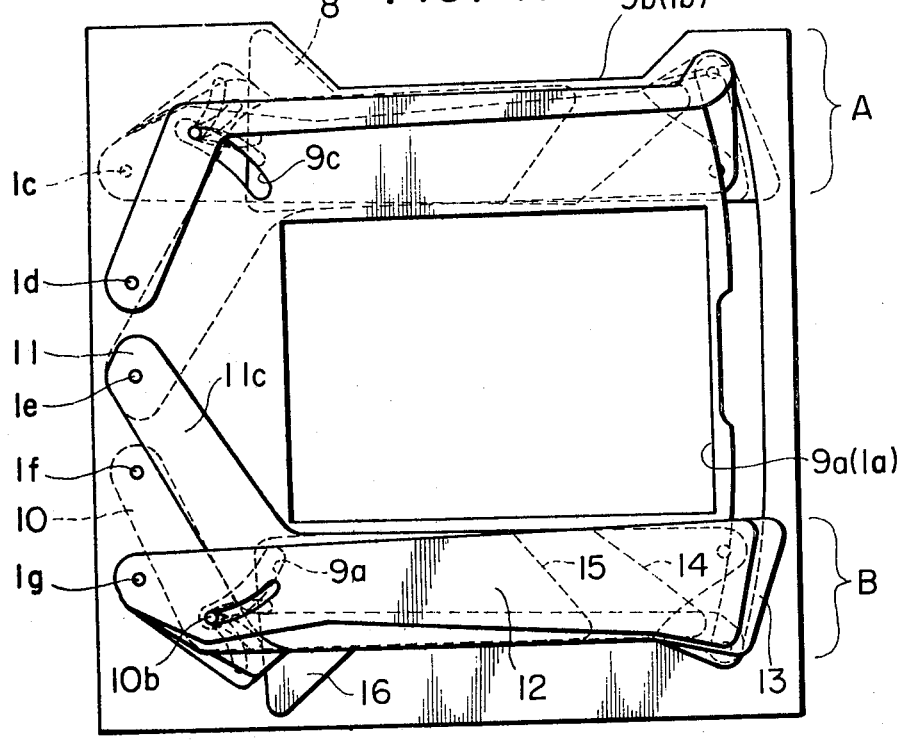
FIG. 13 is an elevational view of the shutter shown in FIG. 12 in its fully opened state.

In FIG. 10, the above described auxiliary shutter blades, main shutter blade, blade actuating arm and blade supporting arm are shown in such manner as makes it possible to clearly understand their overlapping correlation. This assembly forms a shutter opening blade group A. A shutter closing blade group B is formed to be substantially the same as the shutter opening blade group A but its formation shall be explained in the following with reference to FIGS. 11 to 13.

Figure 14:
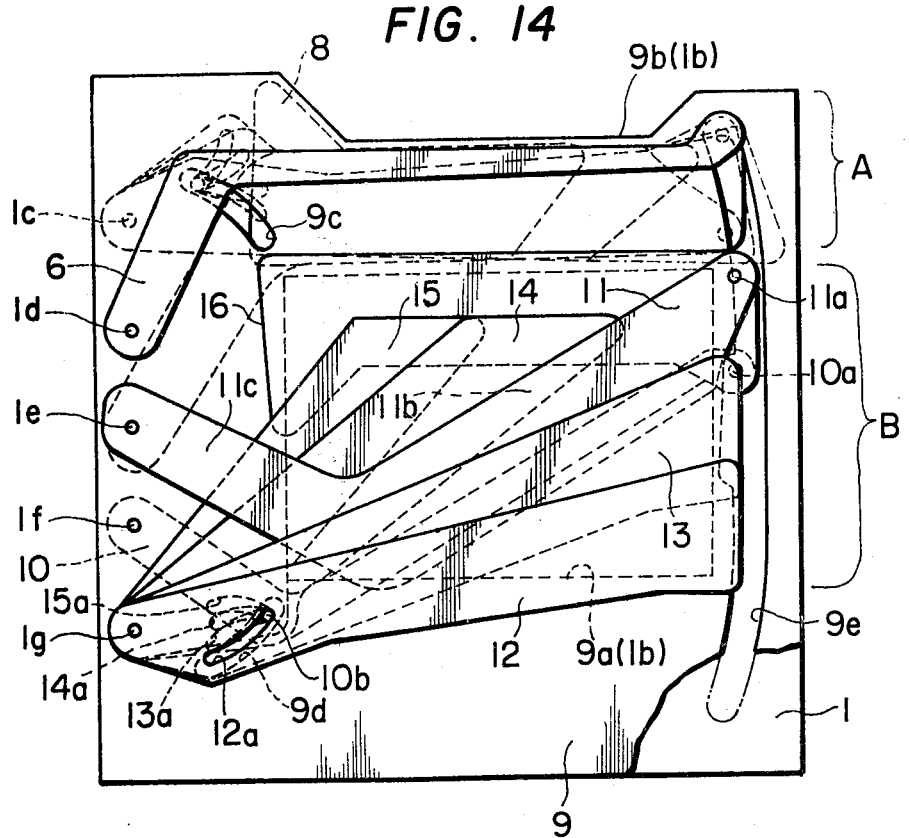
FIG. 14 is an elevational view of the shutter shown in FIG. 12 as the exposing operation is completed, that is, as uncocked.

In FIG. 11, reference numeral 9 indicates a partition plate which has an aperture $9a$ corresponding to the exposure aperture $1a$, an edge $9b$ corresponding to the edge $1b$ and slots $9c$, $9d$ and $93$, houses the auxiliary shutter blades 2, 3, 4 and 5, blade supporting arm 7 and main shutter blade 8 between it and the shutter base plate and is secured to the base plate 1 at a proper distance so that only the blade actuating arm 6 may be positioned on it. Reference numeral 10 indicates a blade actuating arm which has pins $10a$ and $10b$ arranged so as to be movable respectively within the slots $9e$ and $9d$, is interposed between the shutter base plate 1 and partition plate 9 and is rotatably supported by the shaft $1f$. Reference numeral 11 indicates a blade supporting arm which is rotatably supported by the shaft $1e$ on the upper side of the partition plate 9 and has a pin $11a$ in the tip portion. Reference numerals 12, 13, 14 and 15 indicate auxiliary shutter blades which are rotatably supported in the base portions by the shaft $1g$ on the upper side of the partition plate 9 and is pin-slot connected through the pin $10b$ in the same manner as the engagement of the pin $6b$ with the cam slots $2a$, $3a$, $4a$ and $5a$ of the auxiliary shutter blades 2, 3, 4 and 5. Reference numeral 16 indicates a main shutter blade for forming an exposure slit pivoted on the arms 10 and 11 respectively by the pins $10a$ and $11a$. As apparent from this explanation and FIGS. 12 to 14, the shutter closing blade group B is in a mirror image relation with the shutter opening blade group A. That is to say, the order of overlapping the respective blades and arms is reverse to that in the opening blade group A so that, when the opening blade goup A is unfolded, the closing blade group B will be folded and, when the closing blade group B is unfolded the opening blade group A will be folded. Therefore, a further explanation of the formation of the closing blade group B shall be omitted.

The operation shall be explained in the following.

FIG. 12 shows relative positions of the opening blade group A and closing blade group B in the shutter cocked state. When the arm 6 is first unlocked from this state by the operation of a release mechanism not illustrated, this arm 6 will be rotated counterclockwise to the position shown in FIG. 13 by a driving power source not illustrated. With the counterclockwise rotation of the arm 6, the auxiliary shutter blades 2, 3, 4 and 5 will rotate counterclockwise with the shaft $1c$ as a fulcrum to retreat from the apertures $1a$ and $9a$. The arm 6 will also elevate the main shutter blade 8 together with the blade supporting arm 7 while making them keep such horizontal position as shown in FIG. 12 and will open the apertures 1a and 9a for exposure. In this course, the blade supporting arm 7 will move while always covering the clearance formed between the auxiliary shutter blades 3 and 4 with the portion 7b. This covering portion 7b is formed to extend from the pin 7a toward the shaft 1c which is a fulcrum of the auxiliary shutter blades 2 to 5. Further, its base portion 7c is bent to the covering portion 7b so as to be able to move the covering portion 7b as if it were to rotate with the shaft 1c as a fulcrum. Thereby, the blade supporting arm 7 can function as an arm for supporting the main shutter blade 8 together with the blade actuating arm 6 and also a covering member to cover the clearance formed between the auxiliary shutter blades 3 and 4. Thus, while the opening blade group A has fully opened or is opening the exposure apertures 1a and 9a, if the blade actuating arm 10 is unlocked by a known exposure controlling means not illustrated, the closing blade group B will start, will close the exposure apertures 1a and 9a as in FIG. 14 and will complete one exposing operation.

Figure 4:
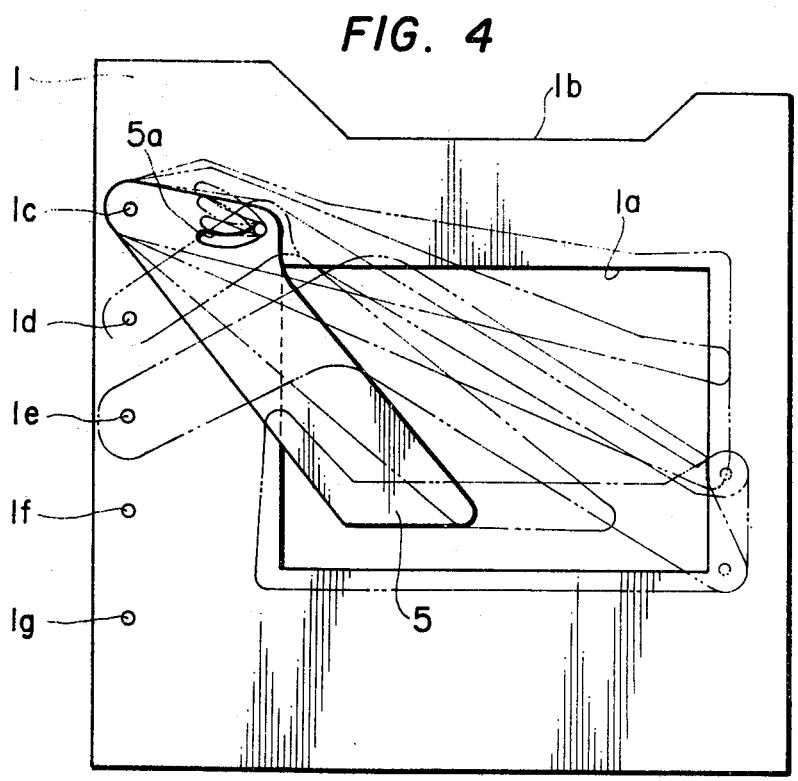
Figure 5:
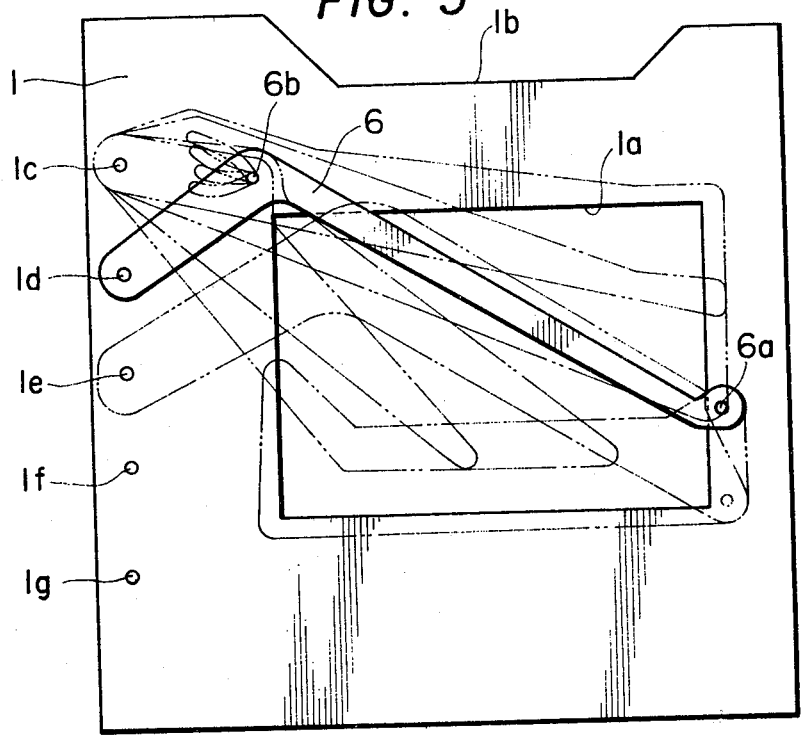
Figure 6:
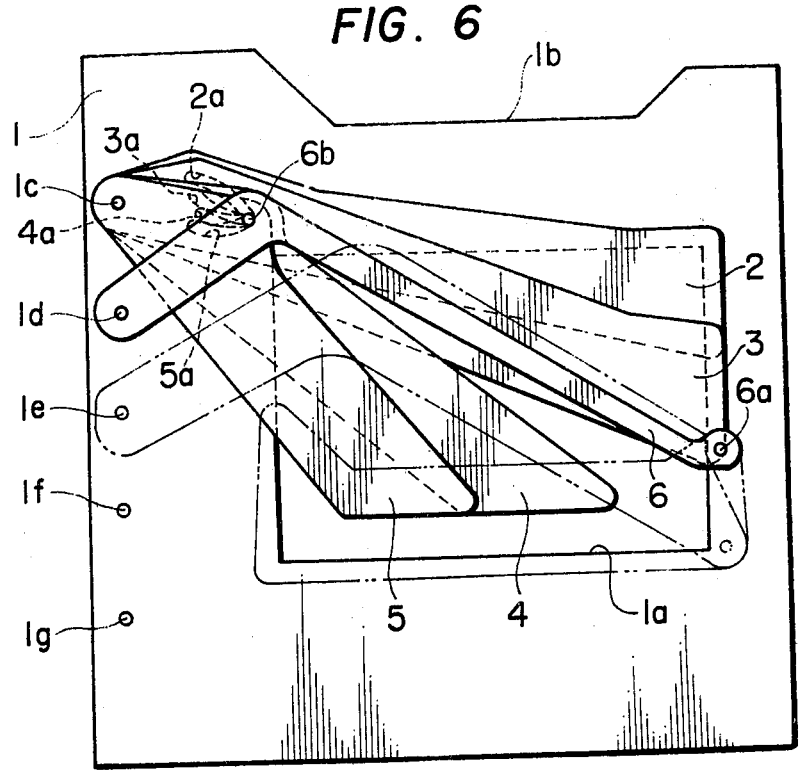
Figure 9:
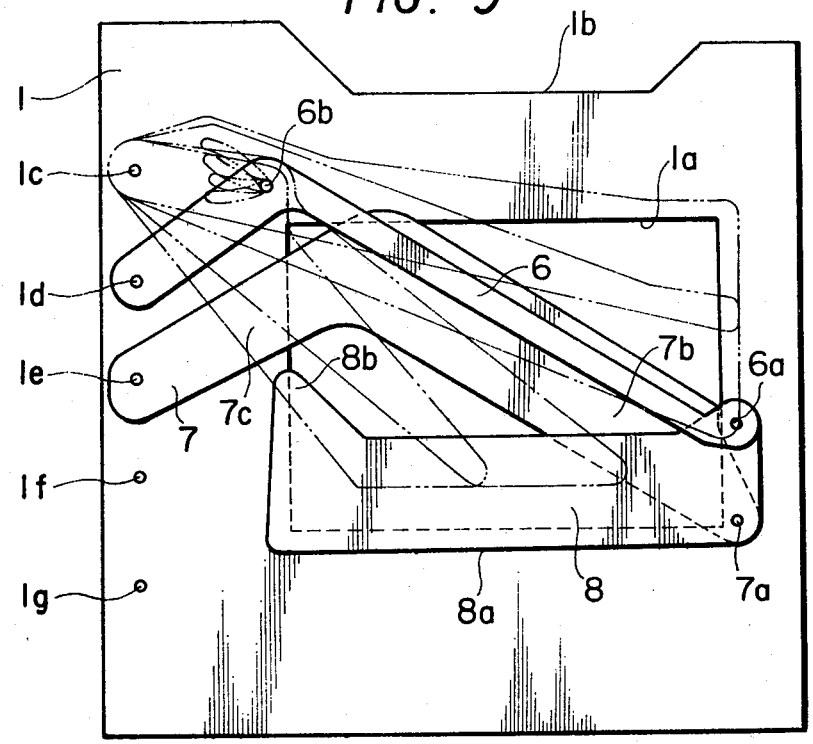

If the actuating arms 6 and 10 are rotated clockwise from the state of the completion of the shutter operation in FIG. 4 by a shutter cocking mechanism not illustrated while the main shutter blades 8 and 11 are kept overlapped on each other, the opening blade group A and closing blade group B will return to the state shown in FIG. 12.

As described above, the blade supporting arms 7 and 11 together with the blade actuating arms 6 and 10 can run the main shutter blades 8 and 16 for forming an exposure slit while keeping them horizontal and the covering portions 7b and 11b can serve as covering members to respectively cover the clearances formed between the auxiliary shutter blades 3 and 4 and between the auxiliary shutter blades 13 and 14. This fact makes it possible to reduce the number of blades of the entire shutter, to narrow the widths of the blades and therefore to reduce the space of housing the blade groups as folded. As a result, the shutter can be compacted.

In the above mentioned embodiment, the two blade groups respectively for opening and closing the shutter are described as having substantially the same formation. However, it is needless to say that this formation is applied to either one of the opening blade group and closing blade group and that a known conventional formation can be used for the other. Anyhow, the main shutter blade 8 or 16 can be made so close to the other blade group arranged opposite it that the leakage of light through the part of contact of the two blade groups, that is, through the edge of the main shutter blade can be minimized.

I claim:
1. A focal plane shutter, comprising:
   a shutter base plate having an exposure aperture formed therein;
   a plurality of auxiliary shutter blades made of opaque laminae and rotatably supported on said base plate by a common shaft to open and close said exposure aperture and having cam slots therein;
   a first arm rotatably supported on said base plate and having thereon a pin fitted in said cam slots;
   a second arm rotatably supported on said base plate at a position different from said common shaft and having therin a first portion capable of covering the clearance formed by an adjacent pair of said auxiliary shutter blades when said plurality of auxiliary shutter blades are in a position of covering said exposure aperture and a second portion extending from said first portion so as to form an L-shape in cooperation with said first portion;
   said second arm being so arranged that said first portion can move by describing substantially the same locus as said plurality of auxiliary shutter blades and said common shaft being placed near to an apparent center of moving locus of said first portion of said second arm; and
   a main shutter blade pivotably supported on said first and second arms and having therein a tail portion including an edge intersecting the edge of said exposure aperture and capable of forming an exposure slit on said exposure aperture.

* * * * *